US012355158B1

(12) United States Patent
Hand et al.

(10) Patent No.: US 12,355,158 B1
(45) Date of Patent: Jul. 8, 2025

(54) VIVALDI ANTENNA STRUCTURES WITH CONCURRENT TRANSMIT AND RECEIVE

(71) Applicant: Lockheed Martin Corporation, Bethesda, MD (US)

(72) Inventors: Thomas Henry Hand, Highlands Ranch, CO (US); Joshua David Gustafson, Castle Rock, CO (US); Adam Blair Hess, Denver, CO (US); Thomas Patrick Cencich, Littleton, CO (US); Braiden T. Olds, Highlands Ranch, CO (US); Joseph M. Torres, Littleton, CO (US); Erik Lier, Lakewood, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 416 days.

(21) Appl. No.: 17/737,450

(22) Filed: May 5, 2022

Related U.S. Application Data

(63) Continuation-in-part of application No. 17/370,177, filed on Jul. 8, 2021, now Pat. No. 12,148,999.

(51) Int. Cl.
*H01Q 21/00* (2006.01)
*H01Q 13/08* (2006.01)
*H01Q 21/20* (2006.01)

(52) U.S. Cl.
CPC ......... *H01Q 21/005* (2013.01); *H01Q 13/085* (2013.01); *H01Q 21/20* (2013.01)

(58) Field of Classification Search
CPC ..... H01Q 21/005; H01Q 13/085; H01Q 21/20
See application file for complete search history.

(56) References Cited

U.S. PATENT DOCUMENTS

| | | | |
|---|---|---|---|
| 2,908,001 | A | 10/1959 | Kelly |
| 3,090,956 | A | 5/1963 | Woodward et al. |
| 3,305,867 | A | 2/1967 | Miccioli et al. |
| 3,508,277 | A | 4/1970 | Bartholomew et al. |
| 4,937,585 | A | 6/1990 | Shoemaker |
| 5,041,840 | A | 8/1991 | Cipolla et al. |
| 5,103,237 | A | 4/1992 | Weber |

(Continued)

FOREIGN PATENT DOCUMENTS

| | | | | |
|---|---|---|---|---|
| CN | 107994354 A | * | 5/2018 | ........... H01Q 21/067 |
| JP | 2006005432 A | | 1/2006 | |

OTHER PUBLICATIONS

Sarkis, R. et al., "Circular Array Of Wideband 3D Vivaldi Antennas," 2010 URSI International Symposium on Electromagnetic Theory, 3 pages, 2010.

(Continued)

*Primary Examiner* — Dieu Hien T Duong

(57) ABSTRACT

Provided herein are various enhancements for antenna systems and directed radio frequency energy structures. In one example, an apparatus includes an antenna array comprising a plurality of Vivaldi antenna elements arranged about an axis perpendicular to a baseplate. Feed elements are coupled to each of the Vivaldi antenna elements through the baseplate. First alternating ones of the Vivaldi antenna elements are configured to transmit radio frequency (RF) energy at a first RF band, and second alternating ones of the Vivaldi antenna elements are configured to receive RF energy at a second RF band.

16 Claims, 14 Drawing Sheets

(56) References Cited

U.S. PATENT DOCUMENTS

| | | | |
|---|---|---|---|
| 5,243,358 | A | 9/1993 | Sanford et al. |
| 5,504,493 | A | 4/1996 | Hirshfield |
| 5,515,057 | A | 5/1996 | Lennen et al. |
| 5,793,335 | A | 8/1998 | Anderson et al. |
| 5,838,282 | A | 11/1998 | Lalezari et al. |
| 5,953,477 | A | 9/1999 | Wach et al. |
| 6,043,785 | A | 3/2000 | Marino |
| 6,243,522 | B1 | 6/2001 | Allan et al. |
| 6,268,835 | B1 | 7/2001 | Toland et al. |
| 6,356,241 | B1 | 3/2002 | Jaeger et al. |
| 6,661,305 | B1 | 12/2003 | Rosenberg et al. |
| 6,720,932 | B1 | 4/2004 | Flynn et al. |
| 9,246,236 | B2 | 1/2016 | Lecam et al. |
| 9,379,437 | B1 | 6/2016 | Stutzke et al. |
| 9,614,290 | B1 | 4/2017 | Remski |
| 11,133,604 | B1 | 9/2021 | West et al. |
| 2004/0041741 | A1 | 3/2004 | Hayes |
| 2005/0007289 | A1 | 1/2005 | Zarro et al. |
| 2007/0063791 | A1 | 3/2007 | Wu et al. |
| 2007/0296518 | A1 | 12/2007 | Avramis et al. |
| 2008/0062056 | A1 | 3/2008 | Hoferer |
| 2008/0297428 | A1 | 12/2008 | Wu |
| 2010/0149061 | A1 | 6/2010 | Haziza |
| 2010/0207833 | A1 | 8/2010 | Toso et al. |
| 2011/0002263 | A1 | 1/2011 | Zhu et al. |
| 2011/0050527 | A1* | 3/2011 | Anderson .......... H01Q 13/0275 343/786 |
| 2011/0267250 | A1 | 11/2011 | Seifried et al. |
| 2013/0271321 | A1 | 10/2013 | Anderson |
| 2014/0294345 | A1 | 10/2014 | Kopp et al. |
| 2015/0236428 | A1 | 8/2015 | Caratelli et al. |
| 2015/0244078 | A1 | 8/2015 | Horner et al. |
| 2016/0056542 | A1 | 2/2016 | Faraone |
| 2016/0156325 | A1 | 6/2016 | Boutayeb et al. |
| 2016/0218436 | A1 | 7/2016 | Rao et al. |
| 2016/0261042 | A1 | 9/2016 | Sazegar et al. |
| 2017/0149134 | A1 | 5/2017 | Klemes |
| 2017/0276867 | A1 | 9/2017 | Kopp |
| 2018/0076521 | A1 | 3/2018 | Mehdipour et al. |
| 2018/0219299 | A1 | 8/2018 | Boutayeb et al. |
| 2018/0269576 | A1 | 9/2018 | Scarborough et al. |
| 2018/0366825 | A1 | 12/2018 | Klemes |
| 2019/0020121 | A1 | 1/2019 | Paulotto et al. |
| 2019/0237873 | A1 | 8/2019 | Sazegar et al. |
| 2019/0252800 | A1 | 8/2019 | Yetisir et al. |
| 2019/0252801 | A1 | 8/2019 | Mahanfar et al. |
| 2019/0280387 | A1 | 9/2019 | Posthuma et al. |
| 2019/0288394 | A1 | 9/2019 | Saraf |
| 2020/0076086 | A1 | 3/2020 | Cheng et al. |
| 2020/0266548 | A1 | 8/2020 | Navarro et al. |
| 2020/0321677 | A1 | 10/2020 | Ali et al. |
| 2020/0343647 | A1 | 10/2020 | Runyon et al. |
| 2020/0348412 | A1 | 11/2020 | Durham et al. |
| 2022/0224005 | A1 | 7/2022 | Yun |
| 2022/0328965 | A1 | 10/2022 | Chalabi et al. |
| 2022/0359989 | A1 | 11/2022 | Wang et al. |
| 2022/0399637 | A1 | 12/2022 | Navarro |

OTHER PUBLICATIONS

Sun, Hai-Han et al., "Compact Dual-Polarized Vivaldi Antenna With High Gain And High Polarization Purity For GPR Applications," Sensors, 17 pages, Jan. 12, 2021.

Zhu, Yongzhong et al., "Generation Of Plane Spiral Orbital Angular Momentum Using Circular Double-Slot Vivaldi Antenna Array," Scientific Reports, 9 pages, Oct. 27, 2020.

Perdana, M. Y. et al., "Design Of Vivaldi Microstrip Antenna For Ultra-Wideband Radar Applications," IOP Conf. Series: Materials Science and Engineering, 10 pages, 2017.

* cited by examiner

VIVALDI ANTENNA STRUCTURES WITH CONCURRENT TRANSMIT AND RECEIVE

RELATED APPLICATIONS

This application is a continuation-in-part of, and claims priority to, U.S. patent application Ser. No. 17/370,177, entitled "MULTIMODE VIVALDI ANTENNA STRUCTURES," and filed Jul. 8, 2021.

TECHNICAL BACKGROUND

Various directional antenna types and configurations employ feed structures to introduce radio frequency (RF) signals to directional reflector elements or receive RF energy from the reflector elements. These reflector elements can include various dish or parabolic reflector arrangements, among others. For certain frequencies and communication modes, the feed structures can become large and complex structures that employ specialized antenna arrangements. Example arrangements include multi-arm sinuous or spiral antennas which reside on a feed structure for a parabolic reflector operating in a dual-mode (e.g. mode 1 and mode 2) configuration. Typical solutions to achieving mode 1 (sum) and mode 2 (difference) patterns for the purposes of direction finding (DF), involve the use of weighted control of sinuous or spiral (multi arm) antennas, such as by applying a 45-degree or 90-degree phase offset to achieve the mode 1 or mode 2 patterns, respectively.

However, these multi-arm sinuous or spiral antennas radiate energy in both upper and lower hemispheres. To provide for feed operations, these antennas require the placement of a cavity and absorber disk beneath the lower hemisphere to maintain adequate pattern performance in the upper hemisphere to feed the directional element. This limits the antenna feed efficiencies of these designs to 50% or less. Thus, such antenna arrangements essentially operate with less gain and RF performance for the sake of achieving mode 1 and mode 2 patterns by proper phasing of the sinuous/spiral arms, and translate to having an antenna feed and reflector system oversized by 3 decibels (dB), or 2× in reflector area (or 1.414× diameter), in order to meet a given performance target. In addition to the efficiency decreases in these arrangements, the cavity and absorber add additional complexity and cost to the systems, while limiting the maximum power handling of the feed.

OVERVIEW

Provided herein are various enhancements for antenna systems and directed radio frequency (RF) energy structures to achieve a constant beamwidth over a wide bandwidth (greater than one octave). One example antenna arrangement includes an array of Vivaldi antenna elements, also referred to as Tapered Slot Antennas (TSAs), that do not require a cavity backed absorber to shape the radiation pattern. Advantageously, the examples herein provide for higher RF performance-higher efficiency and the ability to realize higher gain patterns, as well as providing improvements in manufacturability and cost. For reflector antenna applications, the examples herein result in larger directivity values with smaller beam widths, allowing its incorporation in larger focal length-to-diameter (f/D) systems to improve cross-polarization performance and overall aperture efficiency. Additionally, different geometrical configurations are presented herein to obtain a flatter gain and beam width over a given frequency range than other designs. The gain and beamwidth of this Vivaldi element array can be adjusted by changing the array size. Although four (4) or eight (8) element arrays are discussed herein, similar concepts can apply to other quantities of antenna elements. Additionally, traditional approaches only allow for a single beam per antenna assembly. Thus, these traditional approaches require separate reflector antenna apertures and reflector antenna feed assemblies to achieve both transmit and receive operations. Advantageously, the examples herein can provide for multi-beam applications (i.e. concurrent transmit and receive) within the same aperture and feed assembly.

Provided herein are various enhancements for antenna systems and directed radio frequency energy structures. In one example, an apparatus includes an antenna array comprising a plurality of Vivaldi antenna elements arranged about an axis perpendicular to a baseplate. Feed elements are coupled to each of the Vivaldi antenna elements through the baseplate. First alternating ones of the Vivaldi antenna elements are configured to transmit radio frequency (RF) energy at a first RF band, and second alternating ones of the Vivaldi antenna elements are configured to receive RF energy at a second RF band.

In another example, a system includes an antenna arrangement having a plurality of antenna arrays, each of the antenna arrays comprising at least two Vivaldi antenna elements arranged perpendicular to a corresponding baseplate. Feed elements are coupled to each of the Vivaldi antenna elements through the baseplates. First alternating ones of the Vivaldi antenna elements in each of the antenna arrays are configured to transmit radio frequency (RF) energy at a first RF band. Second alternating ones of the Vivaldi antenna elements in each of the antenna arrays are configured to receive RF energy at a second RF band.

In yet another example, a method includes obtaining from transmit circuitry first radio frequency (RF) energy for coupling to corresponding feed points of each of a first plurality of Vivaldi antenna elements mounted about an axis perpendicular to a baseplate. The method includes transmitting the first RF energy primarily along the axis and away from the baseplate. The method includes receiving second RF energy by a second plurality of Vivaldi antenna elements mounted about the axis. The method includes obtaining the second RF energy from corresponding feed points of the second plurality of Vivaldi antenna elements and providing the second RF energy to receive circuitry.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Discussed herein are antenna feed structures and systems that provide for multi-mode operation with high efficiency beyond that of many existing antenna types. Multi-arm sinuous or spiral antennas (planar or conical) radiate energy in both upper and lower hemispheres, and require nearby placement of a cavity and absorber disk on the lower hemisphere to maintain adequate pattern performance in the upper hemisphere to feed a directional element. This limits the antenna feed efficiencies of these designs to 50% or less. However, the examples discussed herein can readily achieve efficiencies of approximately 90% or greater. One example antenna arrangement discussed herein includes an array of Vivaldi antenna elements that do not require a cavity backed absorber to shape the radiation pattern to a single hemisphere. Although many of the examples employ eight (8) or more Vivaldi antenna elements, other quantities can be employed.

Figure 1:
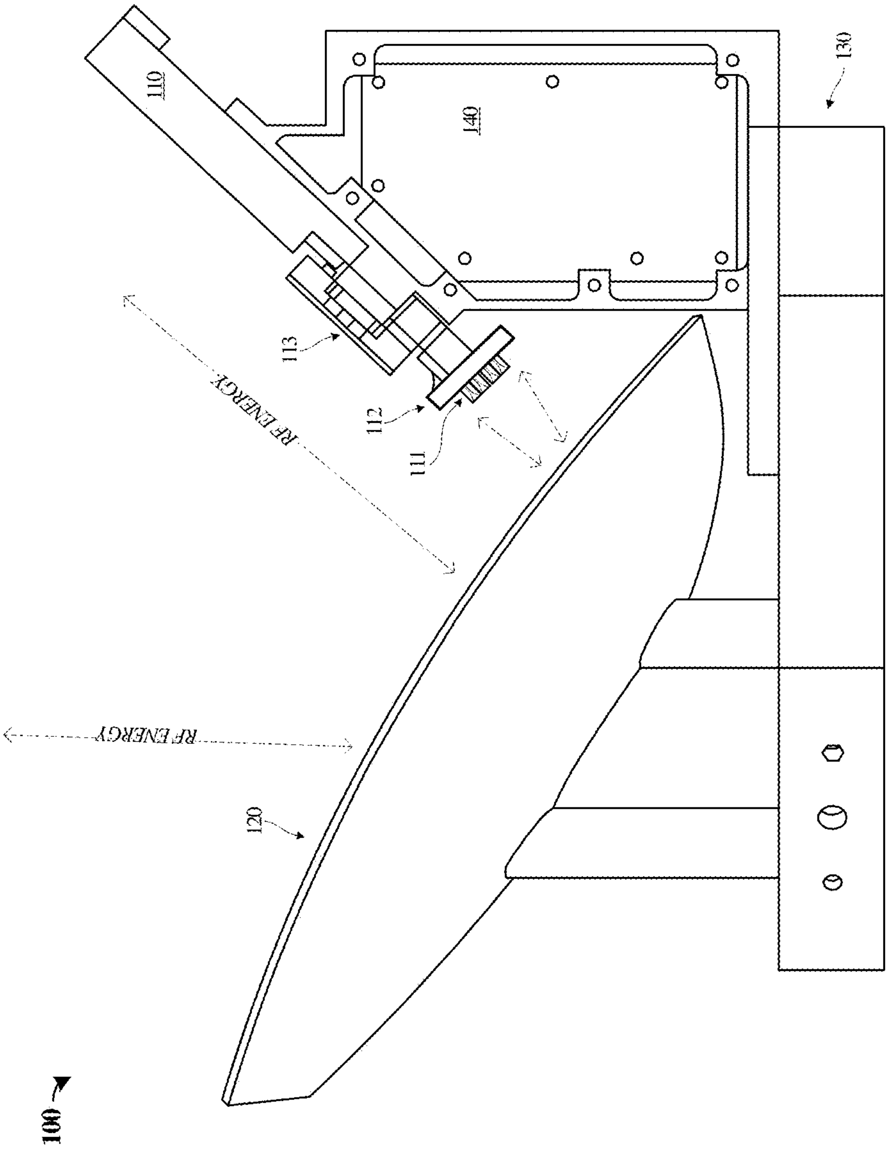
FIG. 1 illustrates an example of a reflector antenna system in an implementation.

FIG. 1 illustrates example antenna system 100 which includes an enhanced feed structure 110. System 100 includes feed structure 110, reflector 120, mount structure 130, and optional communication beamforming network 140, although the exact configuration of the elements in FIG. 1 can vary based on application. Antenna system 100 can be employed on various systems and structures, such as terrestrial structures or vehicles, airborne or spaceborne vehicles, or other similar entities. Various links and interconnect can couple elements of antenna system 100 to other external elements, such as transmitter equipment, receiver equipment, transceiver equipment, power amplifiers, signal amplifiers, or other elements, which can be included in communication beamforming network 140. RF signals can be received over these links from transmitter equipment for transmission by feed structure 110, and likewise, signals received by feed structure 110 can similarly be fed over these links to receiver equipment.

Feed structure 110 is configured to direct RF energy to reflector 120 for transmission (Tx) activities and receive RF energy from reflector 120 during receive (Rx) activities. Concurrent Tx and Rx activities might be supported in certain examples. Feed structure 110 and reflector 120 are mounted to a shared structure, namely mount structure 130, which provides structural support, positioning, and in some examples, tracking of the antenna elements toward a target or desired endpoint.

Feed structure 110 includes antenna array 111 placed at or near the focus of reflector 120. Antenna array 111 comprises an array of Vivaldi type of antenna elements mounted to baseplate 112. Baseplate 112 can couple antenna array 111 to various interconnect represented by connections 113. Connections 113 can comprise coaxial RF connections for coaxial cables or other suitable waveguide elements, although variations are possible. Connections 113 might couple feed structure 110 to various receiver or transmitter circuitry, which may be included in communication beamforming network 140 or other external systems. In transmission operations, RF energy carried over connections 113 is provided to individual antenna elements within antenna array 111 for emission and reflection by reflector 120. In reception operation, RF energy is gathered by reflector 120 for direction to individual antenna elements within antenna array 111 for transfer over connections 113 to communication receiver equipment.

Turning to a further detailed discussion on the elements of FIG. 1, reflector 120 comprises an RF reflector element which can direct and focus RF energy toward a target or received from a source. Various types of parabolic or shaped reflectors can be employed, such as dish, paraboloidal, axially displaced paraboloid, cylindrical, shaped beam, or other types. Although only a primary reflector 120 is shown in FIG. 1, other arrangements might include one or more secondary reflectors, such as in Cassegrain and Gregorian arrangements. Also, not shown in FIG. 1 for clarity, various types of shrouds, radomes, or sunshields might be included around feed structure 110 or reflector 120.

Connections 130 comprise RF connections and associated links to communication equipment used to drive antenna array 111. Connections 130 might comprise various types of coaxial connectors or waveguide connectors. Connections 130 might couple between antenna elements of antenna array 111 and low-noise block downconverter (LNB), amplifier equipment, or other transceiver equipment. Various coaxial cabling or waveguide sections can be included.

Communication beamforming network 140 can include various circuitry, components, transceivers, interconnect, amplifiers, and other elements to support the transmission or reception of RF signals via antenna system 100. Communication beamforming network 140 can comprise any of the aforementioned transmitter, receiver, transceiver, amplifier, LNB, or signal handling elements. Communication beamforming network 140 might be external to the elements shown in FIG. 1. Communication beamforming network 140 can also include various control elements for beamforming, directional control, mode switching, phase control, diagnostics, telemetry and status, or other control elements. These control elements can include various computer systems or microprocessor-based systems which execute software or firmware to achieve any of the operations discussed herein.

As mentioned above, feed structure 110 includes antenna array 111 comprised of individual antenna elements. The individual antenna elements within antenna array 111 comprise Vivaldi antenna elements, with sets of eight such elements employed in this example. The geometry and arrangement of the individual antenna elements can influence the directivity, beam width, frequency range, and other factors. Several example array types and arrangements are discussed herein. However, first a discussion on an individual antenna element is presented in FIG. 2.

Figure 2:
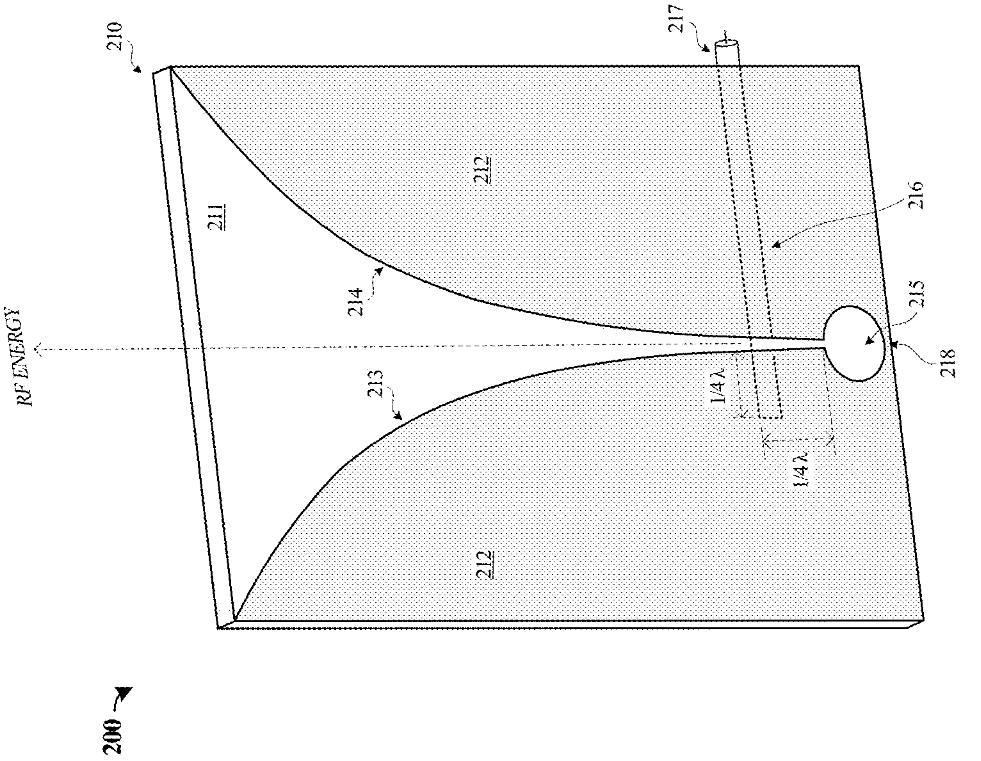
FIG. 2 illustrates an example of a Vivaldi antenna element in an implementation.

FIG. 2 is presented to illustrate an example antenna element which can be employed in an array configuration. Specifically, antenna element 210 is shown comprising a Vivaldi type of antenna element. The Vivaldi antenna, sometimes referred to as or the Vivaldi notch antenna or tapered slot antenna (TSA), comprises a conductive portion having an exponentially tapered radiator arrangement and is considered within a class of broadband planar antennas. Emission of RF energy is shown in FIG. 2 as directed outwards from the 'top' of antenna element 210, and is typically linearly polarized according to the planar orientation of the radiator arrangement.

Although Vivaldi antennas can take various forms, example antenna element 210 shown in FIG. 2 comprises a Vivaldi antenna formed using a printed circuit manufacturing and assembly process. Antenna element 210 comprises substrate 211, conductive layer 212, tapered features 213-214, grounding loop 215, input feed line 216, feed connector 217, and RF ground 218. Substrate 211 comprises a printed circuit board (PCB) dielectric substrate, and can be formed using FR4, RT Duroid, Rogers RO laminates, PTFE, or other similar dielectric materials. Onto substrate 211, conductive features are deposited or etched, namely conductive layer 212 which forms two arms of antenna element 210 noted by tapered features 213-214, as well as grounding loop 215 and RF ground 218. A two-sided PCB can be employed, with conductive layer 212 on a first side of substrate 211 and additional RF feed features formed on a conductive layer on second side of substrate 211. Conductive features on either layer can be formed from copper, silver, gold, aluminum, or other conductive material, including combinations or alloys thereof.

Each printed circuit feature can range in size based on the application, target impedance, and target frequency range. However, in this example, placement and sizing of feed line 216 corresponds to a ¼ wavelength (λ) from 'bottom' end of tapered features 213-214 (e.g. from grounding loop 215) and feed line 216 extends ¼λ beyond tapered features 213-214. This portion of tapered features 213-214 can be referred to as a slot line. Feed line 216 can comprise a microstrip or stripline and is terminated as an open circuit in this example. In contrast, the slot line portion of tapered features 213-214 is terminated in a conductive short circuit element (RF ground 218) after inclusion of grounding loop 215. However, at the frequencies typical for antenna element 210, RF ground 218 acts as an inductor coupled across tapered features 213-214. RF ground 218 is employed for impedance matching, along with grounding loop 215, and to establish desired voltage standing wave ratio (VSWR) properties for antenna element 210 at the desired operating frequency range. Grounding loop 215 may be designed to be circular with a diameter of ¼λ of the center frequency of the desired operating frequency range.

In transmission operations, RF energy generated by a transmitter or signal amplifier is introduced through a coaxial cable or other similar link to connector 217 which couples the RF energy to feed line 216. Feed line 216 propagates this RF energy to the slot line portion of tapered features 213-214, which then propagates down the channel created by tapered features 213-214 for eventual free-space propagation. A similar action happens for reception operation, albeit in a reverse order. By selecting physical features of antenna element 210, such as length/width/curve of tapered features 213-214, size of RF ground 218, diameter of grounding loop 215, attachment location for feed line 216, end termination shapes/features of feed line 216, and other physical features, antenna element 210 can be tuned to achieve various frequency responses, gain properties, power handling capabilities, bandwidths, and impedance properties. In further examples, feed link 216 might include various shapes or geometric arrangements at the termination end for further tuning of performance properties. Feed link 216 may instead comprise a link not formed onto substrate 211, such as a coaxial cable or other link adhered to either face of substrate 211.

However, use of a single Vivaldi antenna element as shown in FIG. 2 can lead to a linear polarized, single mode of operation in many cases. To achieve different polarizations and transmission modes, further enhanced structures and arrangements are discussed in FIGS. 3-12. The various example arrays in FIGS. 3-12 do not require an absorber element or cavity to shape a bidirectional radiation pattern into a unidirectional beam in a single hemisphere. Instead, the arrangement of elements of the array and the use of Vivaldi antenna elements provide for unidirectionality of the beam (in a single hemisphere).

Figure 3:
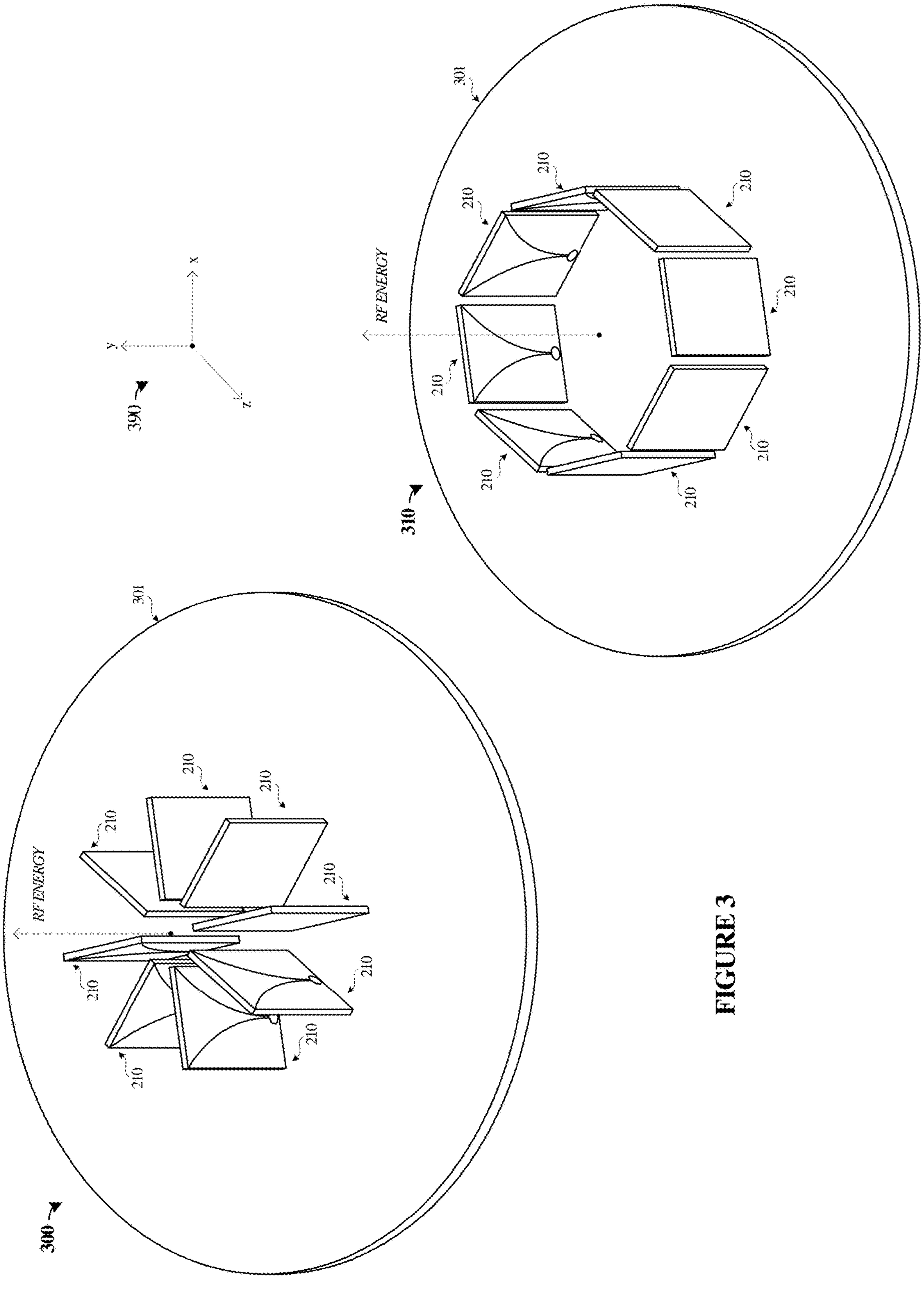
FIG. 3 illustrates example antenna array implementations to achieve wideband mode 1 and 2 patterns.

FIG. 3 details two example implementations of antenna arrays that employ Vivaldi antenna elements mounted onto a baseplate. Example arrangements 300 and 310 comprise wideband, multi-mode antenna structures, which can be employed in feeds for a reflector, such as seen in FIG. 1. The bandwidth of arrangements 300 and 310 are typically set by what can be obtained by a single Vivaldi antenna element, which can be a decade or more of bandwidth. Directional axes 390 are shown in FIG. 3 to aid discussion on the various arrangements.

A first arrangement 300 comprises a "pinwheel" arrangement having eight (8) Vivaldi antenna elements 210 arrayed about a shared central axis (e.g. y-axis) that is perpendicular to baseplate 301. In the pinwheel arrangement, each antenna element 210 has an edge of the associated PCB facing the central axis, with faces of the associated PCB perpendicular to both the face of baseplate 301 and the central axis. A second arrangement 310 comprises an "octagonal" ring configuration having eight Vivaldi antenna elements 210 arrayed about a shared central axis (e.g. y-axis) that is perpendicular to baseplate 301. In the octagonal arrangement, each antenna element 210 has a face of the associated PCB facing the central axis, with edges of the associated PCB perpendicular to both the face of baseplate 301 and the central axis, forming a ring configuration. During transmit operations, RF energy is directed away from the baseplate by antenna elements 210, and during receive operations RF energy is detected as it impinges upon antenna elements 210.

The 8-arm Vivaldi antenna array arrangements discussed herein provide for a low-complexity and high efficiency approach to a wideband multi-mode DF feed. More than one instance or set of an 8-arm arrangement can be established to provide for further beamforming and directionality design goals. Advantageously, an RF beam is directed largely away from the upper face of baseplate 301, achieving approximately a 90% total efficiency. These arrangements also can achieve dual circular polarization performance (RHCP and LHCP) over a wide bandwidth due to the spatial orthogonality of adjacent elements. Elements which are 90 degrees apart can be fed into a beamformer to realize dual-CP mode 1, mode 2, and higher order modes. These arrangements also can provide for more flexibility in choosing a wider range of F/D values in reflector systems, and leads to more benign F/D and subtended angles in reflector systems, such as those in FIG. 1. Improved cross-polarization in reflector systems can be achieved due to the smaller subtended angles in the feed which employs such arrangements. These arrangements also can be employed in RF receiver systems that leverage multi-mode beamforming (i.e. auto tracking feeds). These arrangements also improve the RF performance of system by reducing pre-LNA (low-noise amplifier) losses, which increases the antenna sensitivity for a given reflector diameter.

This compares favorably to the aforementioned multi-arm sinuous or spiral antennas which can only achieve efficiencies as high as 50% due to one-half of the radiated energy being absorbed by a cavity or absorber disk. No such cavity or absorber disk is required in these 8-arm Vivaldi antenna array examples to achieve the high efficiencies in a selected direction of emission/reception. Due in part to the lower part count/complexity and higher efficiency of the 8-arm Vivaldi antenna array examples, for a given G/T (gain/noise temperature) or effective isotropic radiated power (EIRP) requirement, a reduction in the size of the main reflector by 30% or more is achieved, as well as providing for easier assembly and manufacturing. Array feed networks, discussed in the figures below, are also less complex than sinuous/spiral feeds, as the density of connectors is much lower from having the Vivaldi antenna elements spaced apart. In contrast, sinuous/spiral feeds typically have dense feed networks compressed into a central hub, making for difficult high-density RF connections. More conventional corrugated or axi-symmetric metallic horns are also much larger and higher in mass than the Vivaldi antenna arrays discussed herein. Additional advantages include a wider range of gain values and illumination profiles on reflector systems compared with heritage sinuous or spiral antennas. The enhanced arrangements discussed herein provide for feeds and antenna systems which are no longer restricted to the low (~5-10 dBi directivity) and wide field of view of a sinuous or spiral antenna, as the individual Vivaldi type elements can be spaced to realize much higher directivity (15 dBi or more, which permits their implementation in larger F/D reflector systems).

Figure 4:
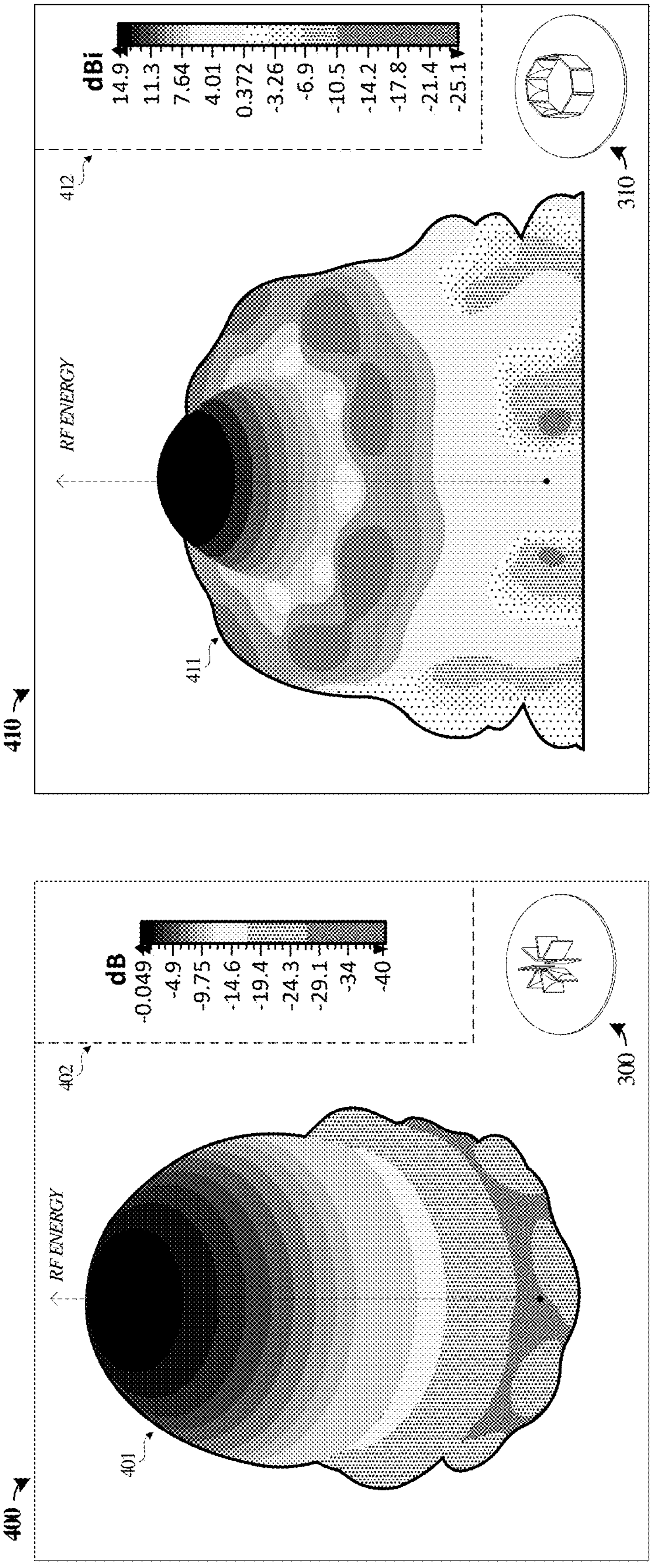
FIG. 4 illustrates example antenna array far-field pattern performance in an implementation.

To further highlight the performance advantages of the example antenna arrangements in FIG. 3, characterization graphs 400 and 410 are included in FIG. 4. FIG. 4 illustrates example antenna array performance in an implementation, namely for antenna arrangements 300 and 310 in FIG. 3. Pictured with each graph is the corresponding antenna arrangement that is used to produce the characterization results.

Turning first to graph 400, characterization result 401 is shown for antenna arrangement 300. Antenna arrangement 300 comprises an 8-element pinwheel arrangement which produces a "Mode 1" or "Sum" RF energy emission far-field beam pattern seen in characterization result 401. Associated emission pattern intensities in decibels (dB) for an example frequency of 37 Gigahertz (GHz) are shown in sidebar 402. Turning next to graph 410, characterization result 411 is shown for antenna arrangement 310. Antenna arrangement 310 comprises an 8-element octagonal arrangement which produces a "Mode 1" or "Sum" RF energy emission beam pattern seen in characterization result 411. Associated emission pattern results in decibels [isotropic] (dBi) are shown in sidebar 412 for an example frequency of 35 GHz. These results indicate a forward gain of antenna arrangement 310, which correspond to the directionality or beamwidth characteristics of antenna arrangement 310. Thus, the characterization results in FIG. 4 indicate that the Vivaldi 8-element feeds from FIG. 3 permit mode 1 and 2 generation over a wide bandwidth, with a controllable beamwidth, in a reduced simplified manufacturing approach. The gain and beamwidth of these Vivaldi element arrays can be adjusted by changing the array size (i.e. adjust the radial values R in the pinwheel configuration).

In addition to the antenna arrays shown in FIG. 3 that employ 8-element Vivaldi antenna arrays, other arrangements are shown in FIGS. 5-9. These further arrangements can be established to meet further performance goals. Several examples shown below can be employed to flatten the nominal beamwidth change versus frequency, among other advantages.

Figure 5:
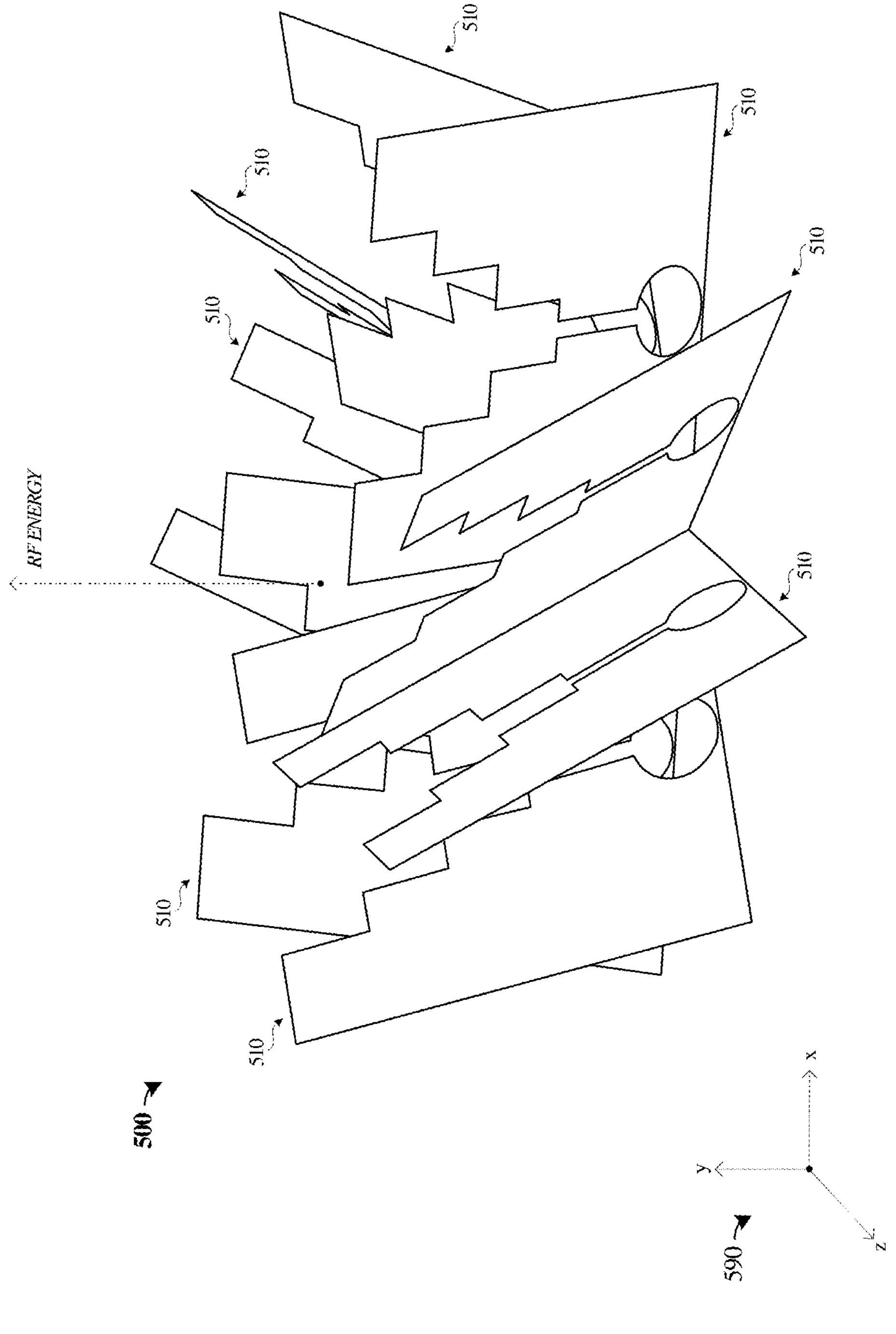
FIG. 5 illustrates an example antenna array in an implementation having a selected beamwidth over a wide bandwidth.

FIG. 5 illustrates example antenna array 500 in an implementation. Antenna array 500 employs Vivaldi antenna elements mounted onto a baseplate (not shown). Antenna array 500 comprises a wideband, multi-mode antenna structure, which can be employed in feeds for a reflector, such as seen in FIG. 1. The bandwidth of antenna array 500 is typically set by that of a single Vivaldi antenna element, which can be a decade or more of bandwidth. Directional axes 590 are shown in FIG. 5 to aid discussion on the various arrangements.

Antenna array 500 comprises a "tilted pinwheel" arrangement having eight (8) Vivaldi antenna elements 510 arrayed about a shared central axis (e.g. y-axis) that is perpendicular to a baseplate (not shown). In the tilted pinwheel arrangement, each antenna element 510 has an edge of the associated PCB facing the central axis, but tilted a selected angle with respect to the central axis. Faces of the associated Vivaldi antenna elements are positioned at a tilt angle to both the face of the baseplate and the central axis. During transmit operations, RF energy is directed away from antenna elements 510, and during receive operations RF energy is detected as it impinges upon antenna elements 510. Due to the tilted configuration, as compared to a non-tilted pinwheel, antenna elements 510 are pointed/tilted away from a boresight of antenna array 500 to reduce directivity of antenna array 500. This arrangement can be employed when a flatter nominal beamwidth change verses frequency property is desired for the antenna array.

Also shown in FIG. 5 are antenna elements 510 that have a step or staggered slot line instead of smooth curved tapered features. The step or staggered slot line can be employed for ease of manufacturing, and to tune emission properties of the individual antenna elements for various frequency response targets. The dimensions of the steps can vary, but may be $\frac{1}{4}\lambda$ of the center frequency of the desired operating frequency range in some examples.

Figure 7:
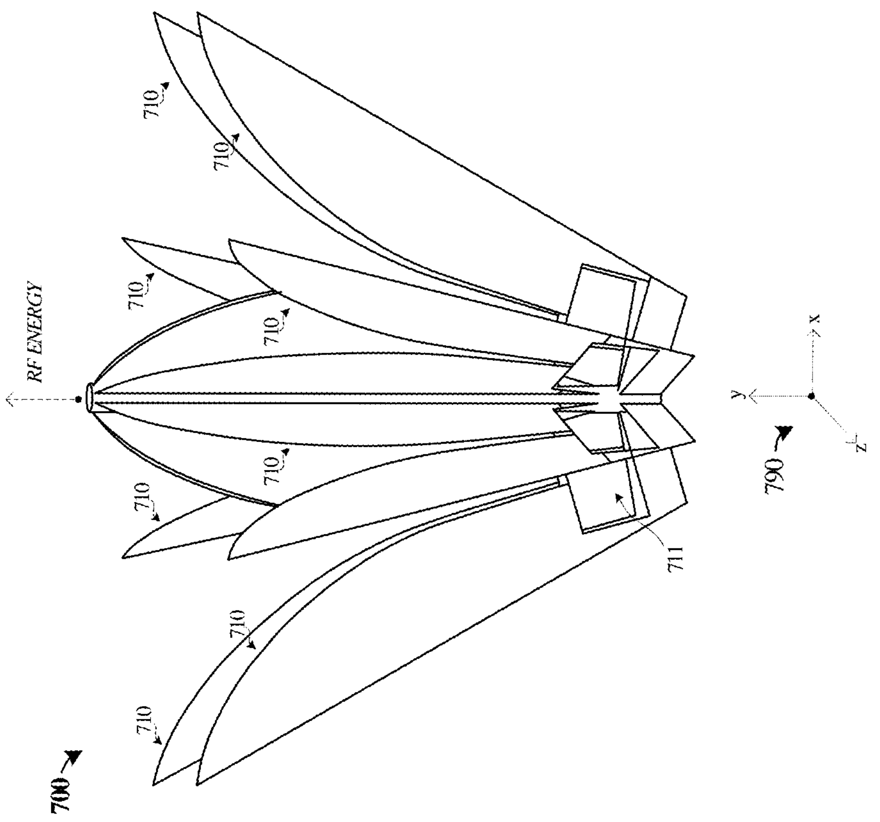
FIG. 7 illustrates an example antenna array in an implementation having a selected beamwidth over a wide bandwidth.
Figure 6:
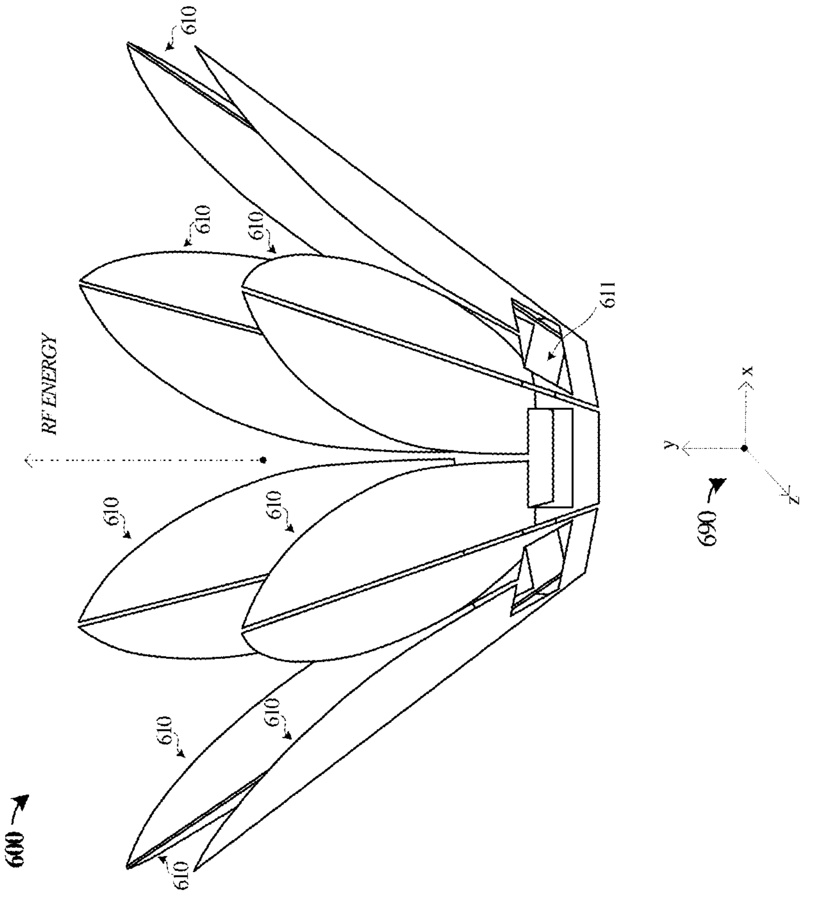
FIG. 6 illustrates an example antenna array in an implementation having a selected beamwidth over a wide bandwidth.

FIGS. 6 and 7 illustrate further examples of tilted antenna element configurations. Antenna arrays 600 and 700 both employ Vivaldi antenna elements mounted onto a baseplate (not shown), and comprise wideband, multi-mode antenna structures, which can be employed in feeds for a reflector, such as seen in FIG. 1. The bandwidth of antenna arrays 600 and 700 are typically set by that of a single Vivaldi antenna element, which can be a decade or more of bandwidth. Directional axes 690 and 790 are shown in FIGS. 6 and 7 to aid discussion on the various arrangements. Also shown in FIGS. 6 and 7 are rectangular cutouts 611 and 711 on each antenna element. These rectangular cutouts can be tuned to the particular impedance matching requirements or to establish desired VSWR properties for the antenna elements at the desired operating frequency range.

Antenna array 600 comprises a "tilted ring" arrangement having eight (8) Vivaldi antenna elements 610 arrayed about a shared central axis (e.g. y-axis) that is perpendicular to a baseplate (not shown). In the tilted ring arrangement, each antenna element 610 is mounted edge-to-edge with an adjacent antenna element. A face of the associated antenna element is arranged facing the central axis but tilted at a selected tilt angle. Antenna array 700 comprises a "tilted radial" arrangement having eight (8) Vivaldi antenna elements 710 arrayed about a shared central axis (e.g. y-axis) that is perpendicular to a baseplate (not shown). In the tilted radial arrangement, each antenna element 710 is mounted having edges positioned towards the central axis, but tilted at a selected tilt angle to form a spoke arrangement among the radially-aligned antenna elements. A central hub element might be employed to fasten the antenna elements in the tilted radial arrangement. During transmit operations, RF energy is directed away from the antenna elements, and during receive operations RF energy is detected as it impinges upon the antenna elements. Due to the tilted configuration, as compared to a non-tilted configuration, antenna elements are pointed/tilted away from a boresight of the corresponding antenna array to reduce directivity of the antenna array. This arrangement can be employed and optimized when a flatter nominal beamwidth change verses frequency property is desired for the antenna array. In addition, the configurations shown in FIGS. 6 and 7 reduce a ring radius needed at the bottom of the array where the array meets the baseplate. These configurations can reduce grating lobes produced by the arrays at higher frequencies, and reduces directivity more at higher frequencies than at lower frequencies due to the element patterns.

Figure 8:
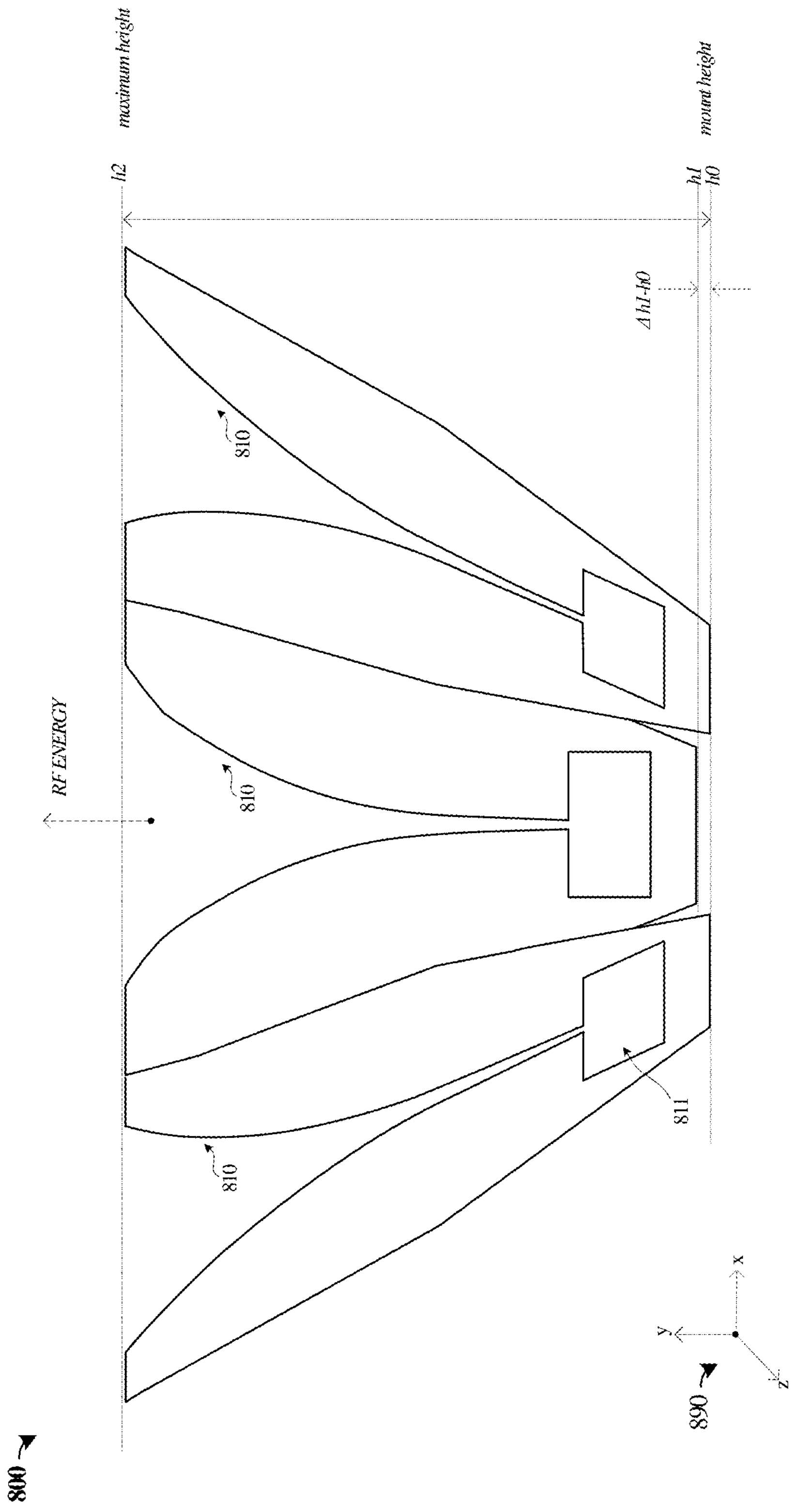
FIG. 8 illustrates an example antenna array in an implementation having a selected beamwidth over a wide bandwidth.
Figure 9:
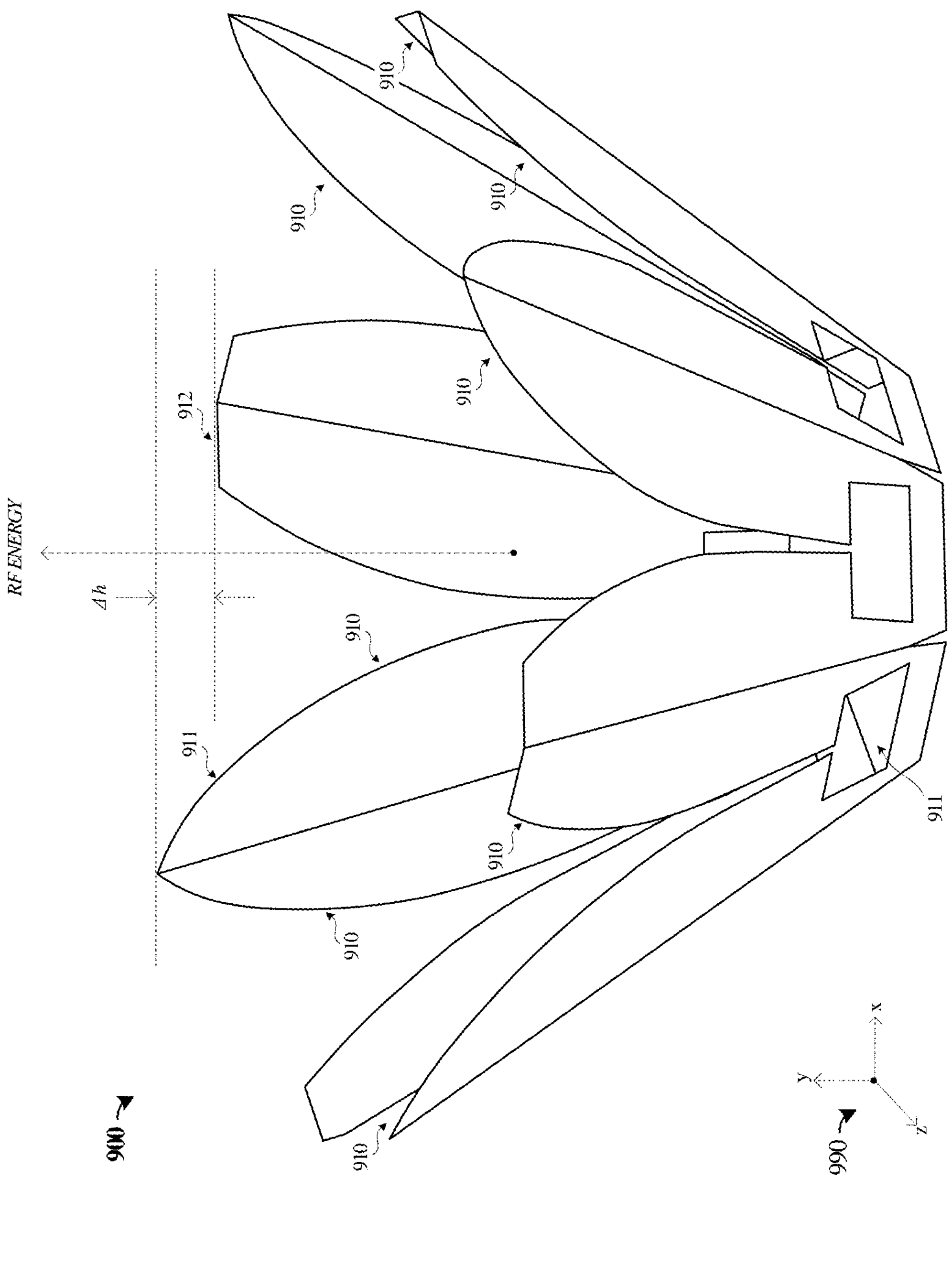
FIG. 9 illustrates an example antenna array in an implementation having a selected beamwidth over a wide bandwidth.

FIGS. 8 and 9 illustrate further examples of antenna arrays having staggered antenna element heights. Antenna arrays 800 and 900 both employ Vivaldi antenna elements mounted onto a baseplate (not shown), and comprise wideband, multi-mode antenna structures, which can be employed in feeds for a reflector, such as seen in FIG. 1. The bandwidth of antenna arrays 800 and 900 are typically set by that of a single Vivaldi antenna element, which can be a decade or more of bandwidth. Directional axes 890 and 990 are shown in FIGS. 8 and 9 to aid discussion on the various arrangements. Also shown in FIGS. 8 and 9 are rectangular cutouts 811 and 911 on each antenna element. These rectangular cutouts can be tuned to the particular impedance matching requirements or to establish desired VSWR properties for the antenna elements at the desired operating frequency range. Antenna arrays 800 and 900 also are arranged in a "tilted ring" arrangement having eight (8) Vivaldi antenna elements (810, 910) arrayed about a shared central axis (e.g. y-axis) that is perpendicular to a baseplate (not shown). In the tilted ring arrangement, each antenna element is mounted edge-to-edge with an adjacent antenna element. A face of the associated antenna element is arranged facing the central axis but tilted at a selected tilt angle.

Antenna array 800 includes increased elevation of alternating or staggered elements. As shown in FIG. 8, a baseline height h0 (e.g. that of the baseplate) is employed to mount first ones of antenna elements 810, and an elevated height h1 is employed to mount second ones of antenna elements 810. A maximum height of antenna elements 810 can be optionally established at height h2 by truncating the heights of the second ones of antenna elements 810 to be even with that of the first ones of antenna elements 810. This staggering of antenna element heights in FIG. 8 creates a path length error so directivity at higher frequencies are reduced. The height truncation of the second ones of antenna elements 810 also can lead to less collimation for the array.

Antenna array 900 includes a similar configuration to that of array 800, but all antenna elements 910 are mounted at the same elevation from the baseplate. However, alternating portions of antenna elements 910 are truncated to be shorter ($\Delta h$) than other portions of the antenna elements. This arrangement creates slightly different radiation patterns among alternating elements to help mitigate directivity increases versus frequency. As can be seen in FIG. 9, a first 'lobe' or radiator element of each antenna element 910 is truncated shorter than a second 'lobe' or radiator element of that same antenna element. Adjacent antenna elements have a mirrored or opposite truncation arrangement. Thus, this establishes alternating heights within the components of each antenna element.

Figure 10:
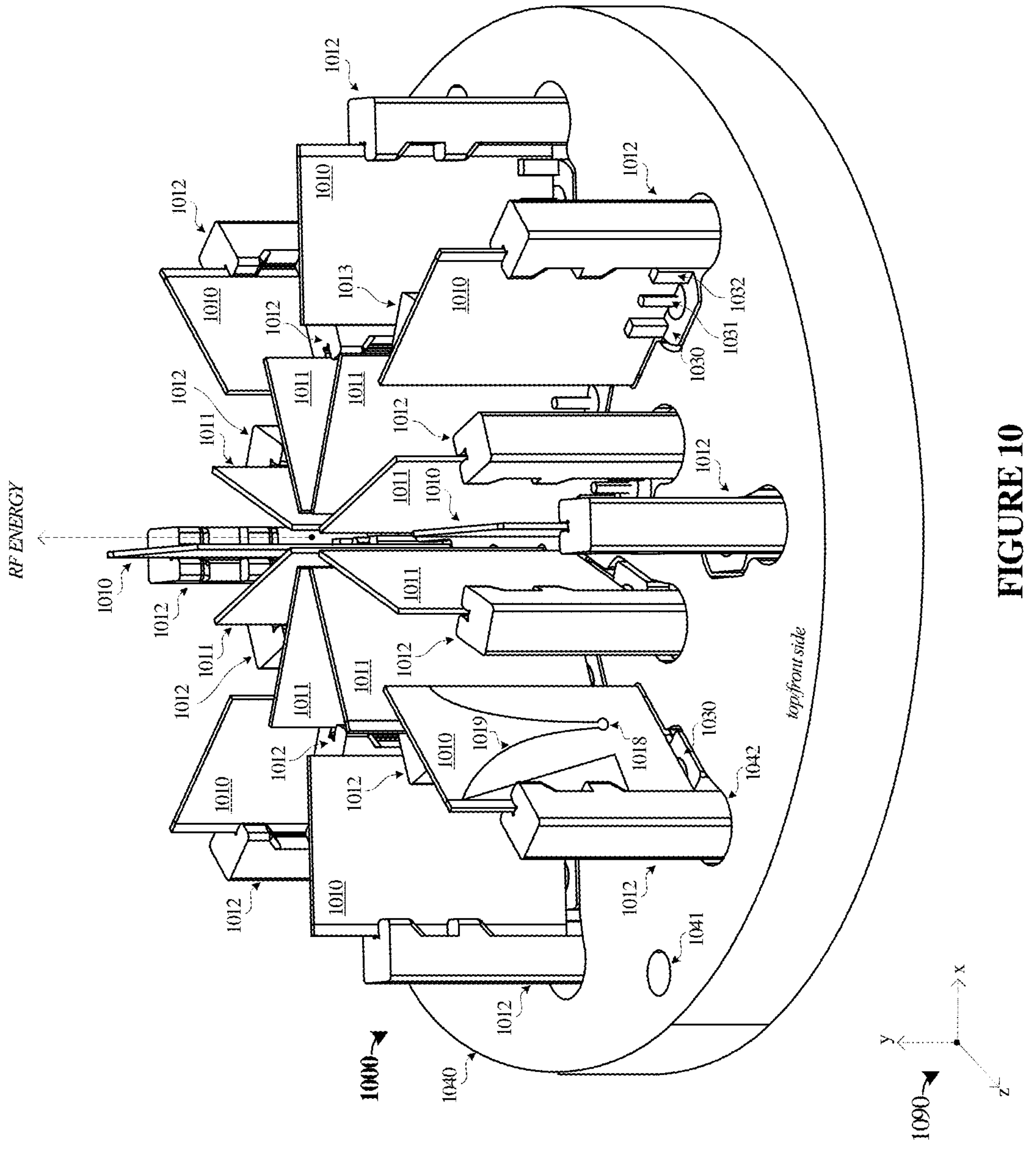
FIG. 10 illustrates an example antenna array with baseplate in an implementation.
Figure 11:
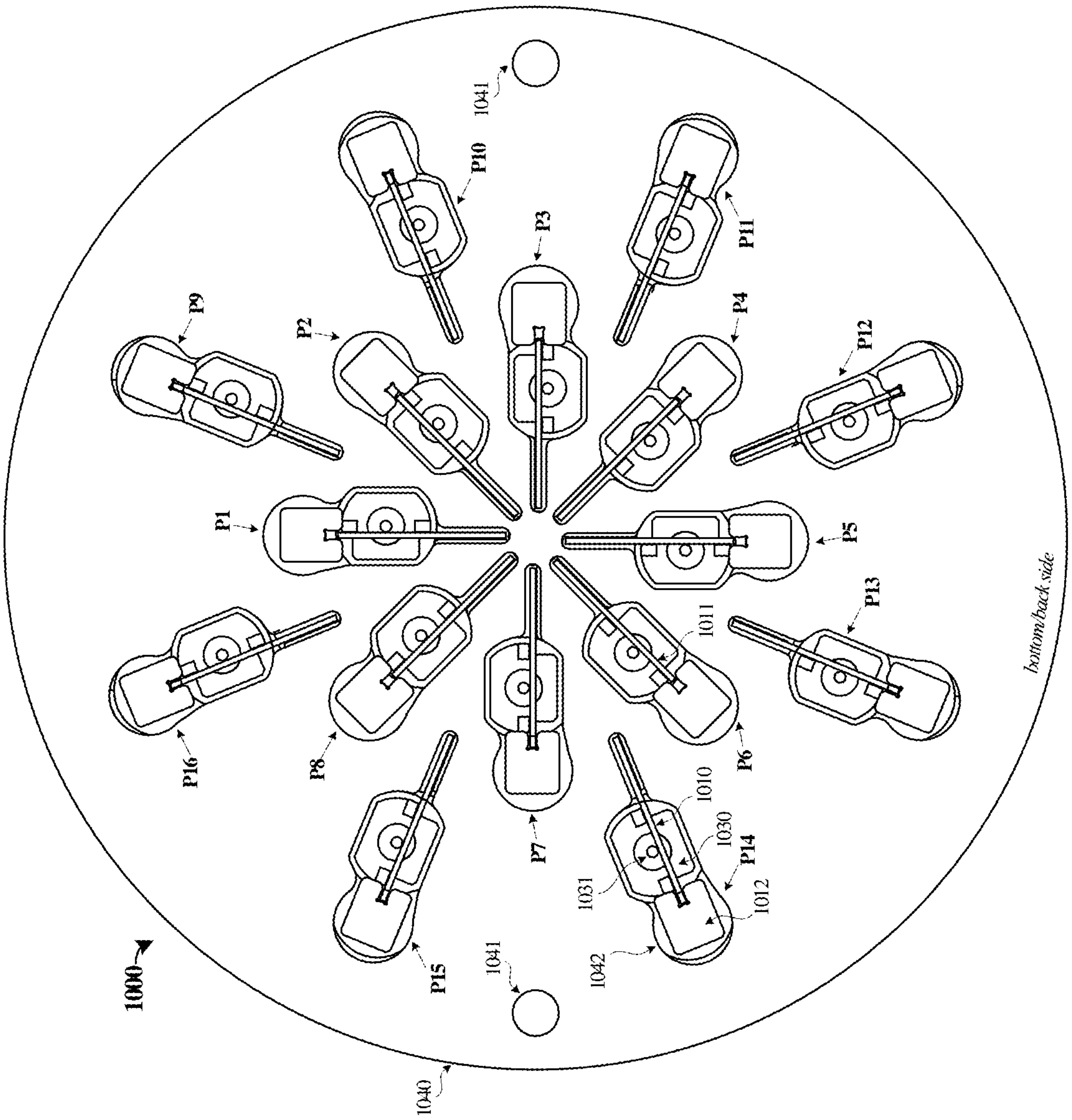
FIG. 11 illustrates an example antenna array with baseplate in an implementation.
Figure 12:
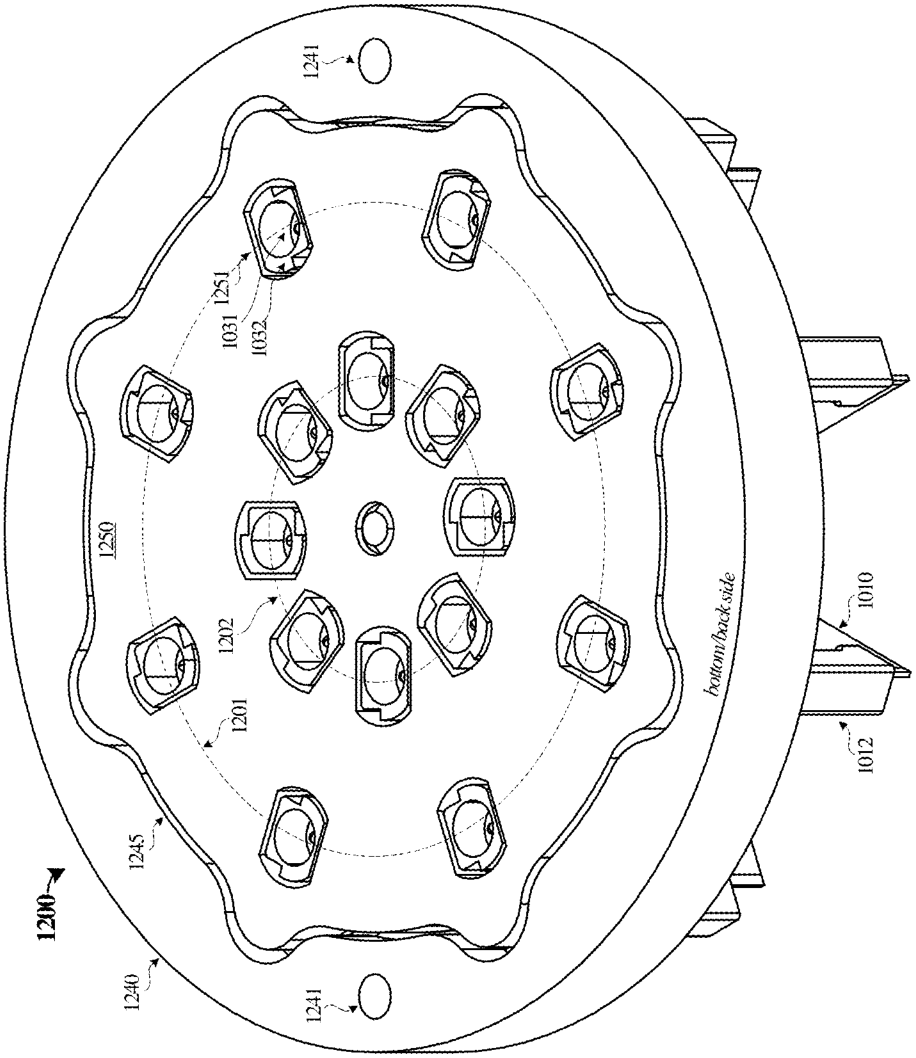
FIG. 12 illustrates an example antenna array with baseplate in an implementation.

FIGS. 10-12 show several views having examples of a feed assembly with two concentric 8-element arrays mounted thereto for a total of sixteen (16) antenna elements. As with the other arrays discussed herein, the feed assembly employs Vivaldi antenna elements mounted onto a baseplate. FIG. 10 includes an isometric top view of feed assembly 1000. FIG. 11 includes a bottom view of feed assembly 1000. FIG. 12 includes an isometric bottom view of feed assembly 1200, which varies from feed assembly 1000. Aspects of the examples in FIGS. 10-12 might also be applied to the antenna array arrangements shown in FIGS. 3-9, such as the baseplate elements, mounting elements, feed elements, and concentric or multi-array configurations.

Feed assembly 1000 and feed assembly 1200 both comprise wideband, multi-mode antenna structures, which can be employed in as feeds for a reflector, such as seen in FIG. 1. The bandwidth of feed assembly 1000 and feed assembly 1200 are typically set by what can be obtained by a single Vivaldi antenna element, which can be a decade or more of bandwidth. Feed assembly 1000 and feed assembly 1200 both comprise a "pinwheel" arrangement having an inner array of eight (8) Vivaldi antenna elements and an outer array of eight (8) Vivaldi antenna elements which are all arrayed about a shared central axis (e.g. y-axis) that is perpendicular to a baseplate. In the pinwheel arrangement, each antenna element has an edge of the associated PCB facing the central axis, with faces of the associated PCB perpendicular to both the face of the baseplate and the central axis. During transmit operations, RF energy is directed away from the baseplate by the antenna elements, and during receive operations RF energy is detected as it impinges upon the antenna elements.

Turning now to FIG. 10, feed assembly 1000 is shown as including outer antenna elements 1010, inner antenna elements 1011, element fixtures 1012, connector assemblies 1030, and baseplate 1040. Each of antenna elements 1010 and 1011 comprise Vivaldi type antenna elements formed from PCB structures. Example Vivaldi radiator 1019 is shown with cutout 1018. Various other features of Vivaldi radiator 1019 can be employed, such as edge feathering, tilt away from the central axis, or various types of feed lines and cutout shapes. Connector assemblies 1030 each include feed link 1031 and antenna mounts 1032. Connector assemblies 1030 are each inserted into apertures 1042 formed within baseplate 1040, such that RF connections can be made on a bottom or back side of baseplate 1040 and antenna elements can be secured and arrayed on the top or front side of baseplate 1040. Baseplate 1040 also can include one or more mounting features 1041 to mount baseplate 1040 onto an antenna assembly or dish assembly. Directional axes 1090 are shown in FIG. 10 to aid discussion on the various arrangements.

FIG. 11 shows elements from FIG. 10 in a bottom or back view looking along the y-axis. As can be seen in FIG. 11, apertures 1042 each house an associated connector assembly 1030. Connector assembly 1030 includes feed line 1031 and antenna supports 1032 which are coupled to element fixtures 1012 and support each antenna element within a particular position in a vertical orientation (with respect to baseplate 1040). Connector assembly 1030 can also include RF connectors or waveguide couplers to connect an individual RF link to each individual antenna element. Phasing, polarization, or individual control over each antenna element can be achieved using these individual/independent links. Individual connectors can also be coupled to an external beamforming network (BFN) to produce mode 1 and mode 2 patterns as needed. The inner array of antenna elements is noted by designators P1-P8, and the outer array of antenna elements if noted by designators P9-P16. The separate inner/outer arrays can be used concurrently to achieve desired transmission/reception properties, or may instead be segregated having one array for reception and one for transmission.

FIG. 12 illustrates similar elements as seen in FIGS. 10 and 11, except from the underside with the individual radiating element connectors. However, FIG. 12 includes a different configuration baseplate 1240 having a large central aperture 1245 to support sub-assembly 1250 which houses elements similar to outer antenna elements 1010, inner antenna elements 1011, element fixtures 1012, and connector assemblies 1030 from FIGS. 10 and 11. Apertures 1251 are in a configuration to allow for connectors for each antenna element on the opposite side of baseplate 1240. These connectors can include feed link 1031 and be coupled to antenna mounts 1032. Inner array 1202 and outer array 1201 are shown in FIG. 12.

Figure 13:
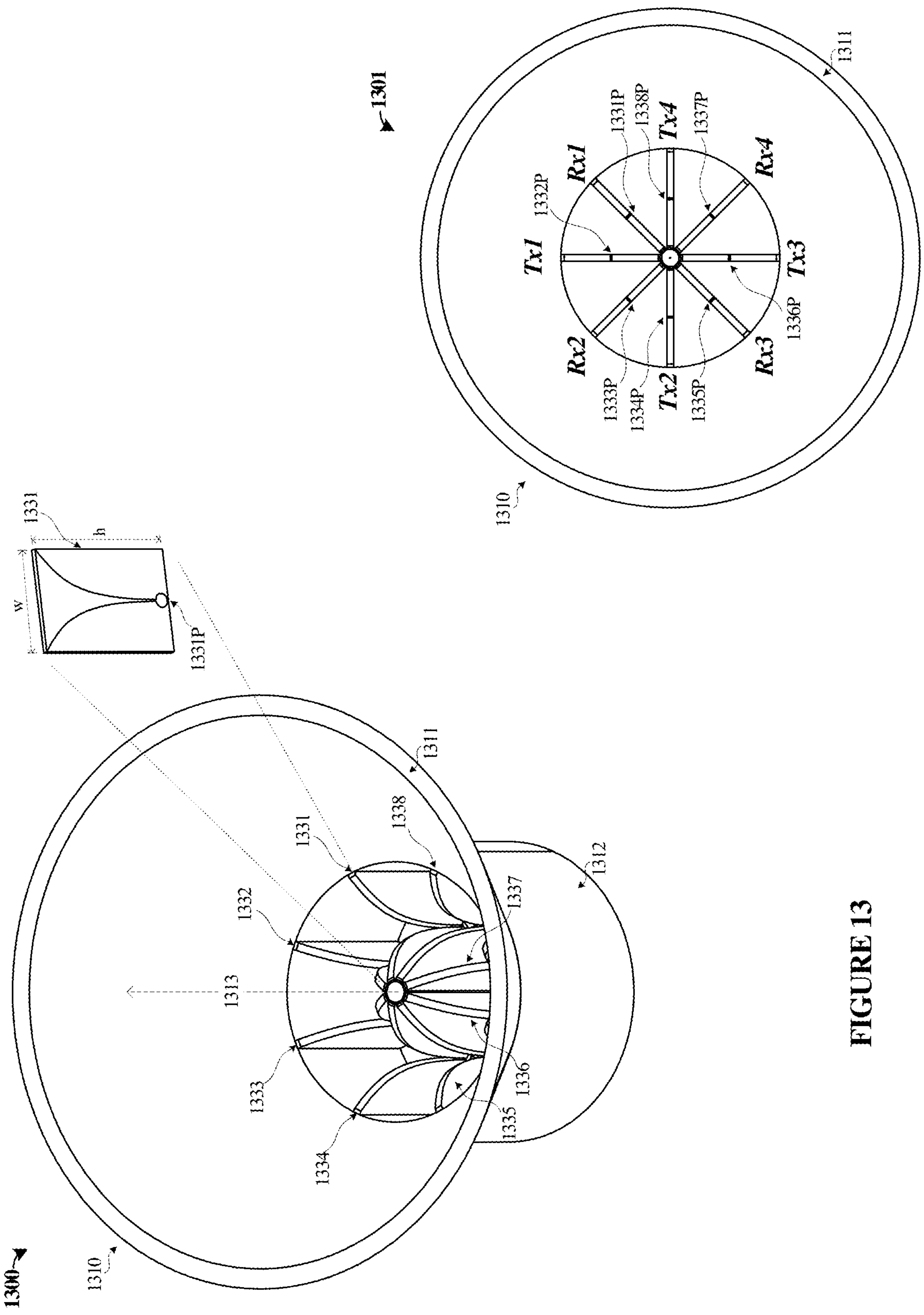
FIG. 13 illustrates an example antenna array in an implementation.

FIG. 13 illustrates example antenna array 1310 in an implementation. View 1300 shows a perspective end-view of array 1310, and view 1301 shows an end view of array 1310 with various functional groups highlighted. Antenna array 1310 comprises a multi-mode wideband Vivaldi antenna array with simultaneous transmit and receive capability. Often, antenna array 1310 is employed in a reflector feed arrangement such as seen in FIG. 1 for antenna array 111. However, antenna array 1310 can be employed in other arrangements and assemblies. As with the examples above, antenna array 1310 does not employ an absorber element to shape a radiation pattern of the antenna array to a single hemisphere.

Turning first to view 1300, antenna array 1310 includes a flared horn portion 1311 positioned onto a non-flared cylindrical perimeter encasement or radial enclosure element 1312. The horn portion and enclosure element might be omitted in some examples, and the example antennas noted herein might also employ horn portions and radial enclosures to increase isolation. Horn portion 1311 and enclosure element 1312 can comprise various conductive materials, such as metallic materials or coated polymer materials formed using various machining or molding techniques. Within a cavity formed by enclosure element 1312, eight (8) Vivaldi antenna elements are positioned about a central axis 1313, namely antenna elements 1331-1338. This arrangement shows the "pinwheel" arrangement having eight (8) Vivaldi antenna elements 1331-1338 arrayed about a shared central axis 1313 that is perpendicular to a baseplate (not shown). In the pinwheel arrangement, each antenna element 1331-1338 has an edge of the associated antenna structure facing the central axis, with faces of the associated antenna structure perpendicular to both the face of the baseplate and the central axis.

An example Vivaldi antenna element detailed view is shown for element 1331, which comprise feed point 1331P. As with the various Vivaldi antenna elements discussed herein, the individual antenna elements can be formed from printed circuit boards or other materials. Other antenna elements 1332-1338 can include similar features as shown for element 1331, including feed ports (denoted by a 'P' label in view 1301). A baseplate, such as seen in FIGS. 10-12, can be included and provide for connector assemblies each include feed links, which can be fed by coaxial or waveguide elements. Although 8 Vivaldi elements are shown in FIG. 13, other quantities can be employed, such as four (4). The number of elements employed can affect the variation of an associated RF transmit or receive radiation pattern. Typically, more elements leads to a smoother radiation pattern.

As mentioned, antenna array 1310 supports concurrent or simultaneous transmit and receive operations, sometimes referred to as full duplex operations. View 1301 shows one example configuration of transmit (Tx) and receive (Rx) handling with interleaved Tx and Rx antenna elements as arrayed about the central axis. Alternating ones of the antenna elements correspond to either Tx or Rx operations, and are coupled to feed networks or transmitter/receivers accordingly. Specifically, for receive operations, element 1331 corresponds to Rx1, element 1333 corresponds to Rx2, element 1335 corresponds to Rx3, and element 1337 corresponds to Rx4. Also, element 1332 corresponds to Tx1, element 1334 corresponds to Tx2, element 1336 corresponds to Tx3, and element 1338 corresponds to Tx4. Rx1-Rx4 each can couple to a beamforming arrangement configured to form a receive beam from among four corresponding Vivaldi antenna elements 1331, 1333, 1335, and 1337. Likewise, Tx1-Tx4 each can couple to a transmit beamforming arrangement configured to form a transmit beam among four corresponding Vivaldi antenna elements 1332, 1334, 1336, and 1338. A discussion on the beamforming arrangements is included below, although for four (4) element arrays instead of eight element arrays. Similar principles and techniques apply.

Although various frequency bands can be supported by antenna array 1310, typically an approximately 17-31 GHz frequency range is supported for microwave Ka communications. The frequency bands supported can relate to the physical dimensions of antenna array 1310. For such a frequency range noted above, a horn aperture of 1541.98 mil and a total antenna height of 1617.45 mil can be employed. Individual Vivaldi antenna elements, such as 1331, can have a length or height of 682.59 mil, a width of 360.59 mils, and a thickness of 29.68 mils. It should be understood that frequency and dimensional variation is within the scope of this disclosure. However, in an example application, a satellite-to-ground system (or ground-to-satellite) can include a parabolic reflector feed employing the arrangement in FIG. 13. Concurrent transmit and receive operations can occur using the same horn feed (e.g., 1310) but different RF bands for Tx/Rx. For an example satellite, an Rx frequency band includes a 20 GHz centered band (19.45 GHz), and an Tx frequency band includes a 30 GHz centered band (29.25 GHz), both within the microwave Ka band. A ground station might employ an opposite arrangement for Rx/Tx. Spectral separation is established between Tx and Rx frequencies, with approximately 100 dB of rejection between the Tx/Rx bands. When the Tx and Rx bands are spectrally disjoint, a significant increase in isolation can be achieved.

Each Vivaldi element in FIG. 13 can have a linear polarization (individually), but when arrayed as shown, and driven with a beamforming network, can achieve RH/LH circular polarizations. For example, Rx-corresponding antenna elements can be coupled to a 4:2 beamforming network (BFN), while Tx-corresponding antenna elements can be coupled to a separate 4:2 BFN. The terminology of 4:2 refers to four antenna elements coupled to two feed links, with a beamforming network configured to handle phasing and distribution of the links to each antenna element. Concurrent beams having associated circular polarizations can be established for both Tx and Rx in this manner. Narrowband isolation between Tx/Rx is achieved with these beamformers and the interleaving of Tx/Rx elements. Narrowband antenna elements other than Vivaldi-type elements can be employed in similar beamforming and interleaving arrangements to achieve over 90 dB isolation between the Tx and Rx elements. Additionally, traditional approaches only allow for a single beam. Thus, these traditional approaches require separate reflector antenna apertures and reflector antenna feed assemblies to achieve both transmit and receive operations. Advantageously, the examples in FIGS. 13-15, among other examples herein, provide for multi-beam applications (i.e. concurrent transmit and receive) without separate reflector antenna apertures and reflector antenna feed assemblies. The interleaving of elements for increased isolation enables a transmit and a receive beam to be accommodated on a single feed illuminating a single reflector.

Figure 14:
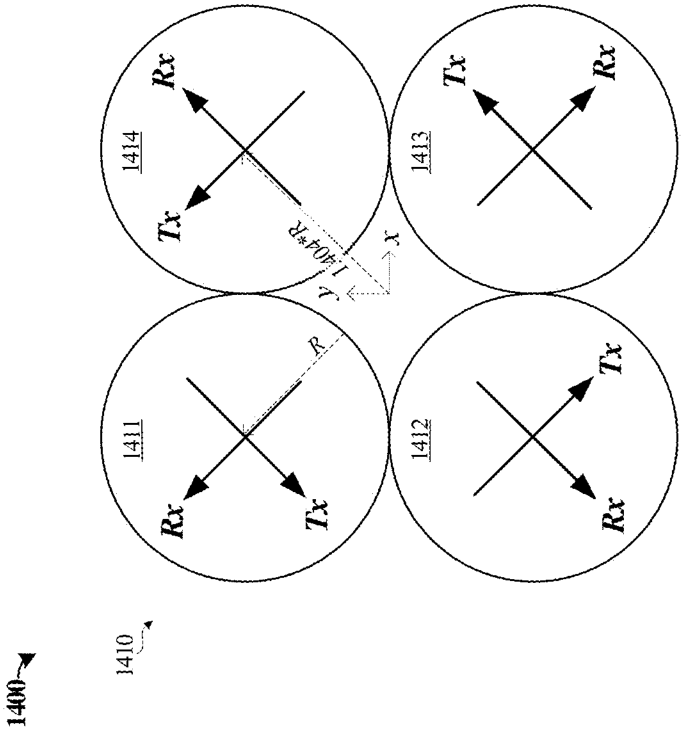
FIG. 14 illustrates an example antenna array polarization configuration in an implementation.
Figure 15:
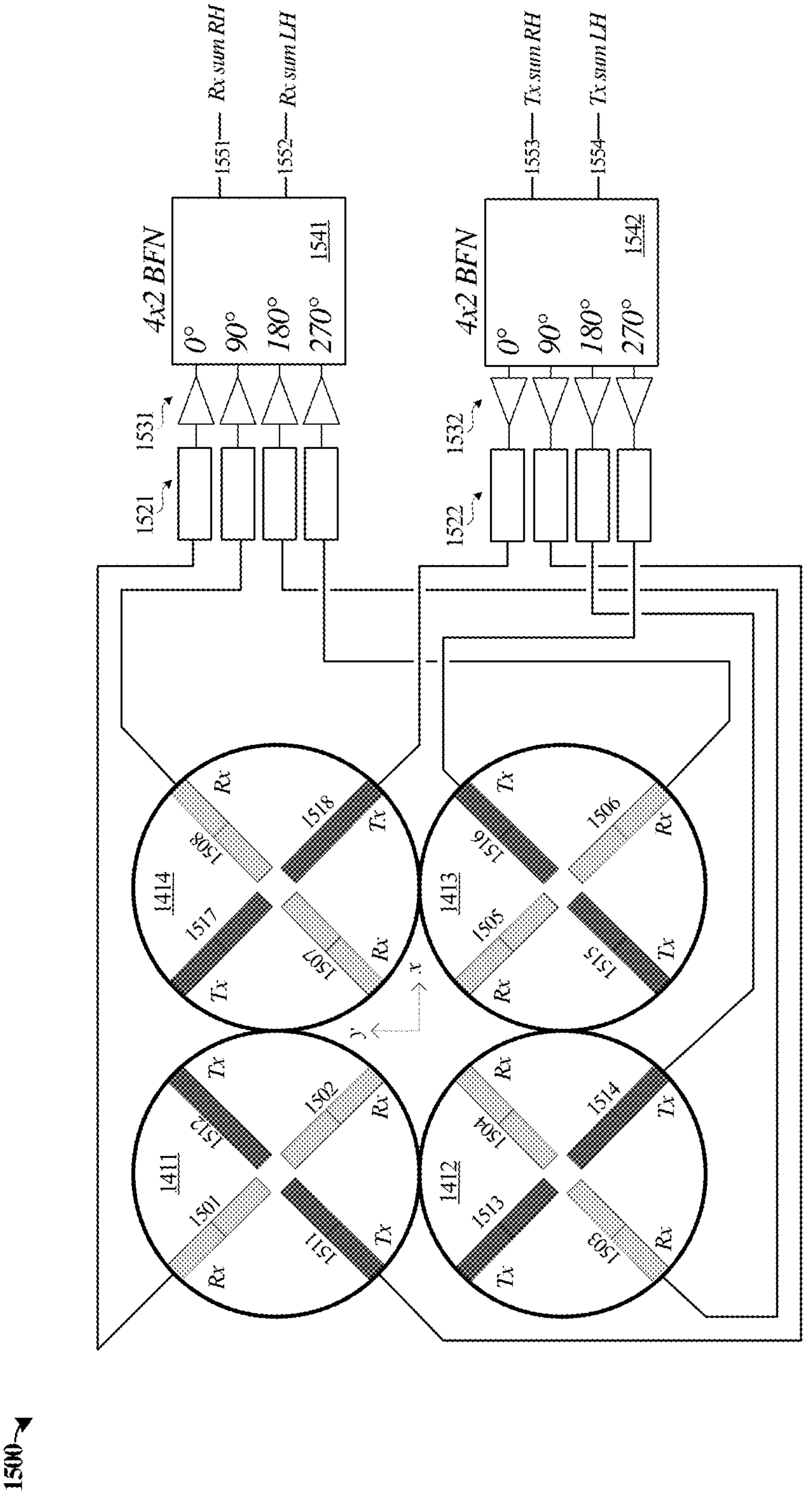
FIG. 15 illustrates an example antenna array feed network configuration in an implementation.

Turning now to various techniques and arrangements to couple the configuration of FIG. 13 and other four-element configurations to beamforming networks, FIGS. 14 and 15 are presented. FIG. 14 illustrates an example antenna array polarization configuration 1400 in an implementation. Configuration 1400 includes antenna arrangement 1410 which comprises four antenna arrays 1411-1414 abutted in a 2×2 grid in the x-y plane, with RF energy directed or received in the z-axis (out of the page). Example dimensions are shown in FIG. 14, such as a radius R for each antenna array, and a distance 1.404*R from a central point of the entire arrangement 1410 to a center of any given antenna array. As with the examples above, arrangement 1410 does not employ absorber elements to shape a radiation pattern of the antenna arrays to a single hemisphere.

Although not shown for clarity, each of the antenna arrays further includes a baseplate and four (4) Vivaldi antenna elements arrayed about a central axis of the associated antenna array. Configuration 1400 can reduce the quantity of Vivaldi antenna elements needed per-antenna from eight to four. Configuration 1400 has improved Tx and Rx isolation due in part to the Tx and Rx RF energy being handled on orthogonal polarizations. Configuration 1400 also can employ a reduced beamforming network, such that instead of an 8×4 BFN, a 4×2 BFN can be employed.

Configuration 1400 shows the orthogonal nature among the Tx and Rx components which provide for increased isolation among Tx/Rx within each antenna array. Specifically, each antenna array 1411-1414 includes orthogonally driven Rx and Tx antenna elements, with a phase angle or rotation established as different for each of the antenna arrays of arrangement 1410. Associated BFNs are coupled to the individual antenna elements to establish such orthogonal Tx/Rx components. FIG. 15 illustrates example suitable BFNs.

FIG. 15 illustrates an example antenna array feed network configuration 1500 in an implementation, namely an example four-feed beamforming configuration. Configuration 1500 shows antenna arrangement 1410 which comprises four antenna arrays 1411-1414 abutted in a 2×2 grid in the x-y plane, with RF energy directed or received in the z-axis (out of the page). Each of antenna arrays 1411-1414 comprises an array of four Vivaldi elements with an enclosure element and flared horn, such as seen in FIG. 13 for an eight element array. Antenna array 1411 includes Rx pair 1501-1502 and Tx pair 1511-1512. Antenna array 1412 includes Rx pair 1503-1504 and Tx pair 1513-1514. Antenna array 1413 includes Rx pair 1505-1506 and Tx pair 1515-1516. Antenna array 1414 includes Rx pair 1507-1508 and Tx pair 1517-1518.

Configuration 1500 shows each Vivaldi antenna element coupled (as pairs) to individual ones among optional in-line filters 1521-1522 (i.e. stripline filters) further coupled to individual ones among RF amplifiers 1531-1532. RF amplifiers 1531-1532 then couple to beamforming networks (BFNs) 1541-1542, with Rx and Tx having separate BFNs in this example. Input/output links 1551-1554 correspond in pairs to Rx and Tx sum signals for right-hand polarization (RH) and left-hand polarization (LH). Input/output links 1551-1554 couple to transmitter and receiver circuitry (not shown) configured to generate associated Tx RF signals or receive associated Rx RF signals.

Thus, an interleaved or alternating arrangement of individual Vivaldi antenna elements within each antenna array 1411-1414 is established. First alternating ones of the Vivaldi antenna elements for each antenna array 1411-1414 are coupled to a 4:2 transmit (Tx) beamforming network 1542 having signal inputs having more than one polarization component (1553-1554). Second alternating ones of the Vivaldi antenna elements for each antenna array 1411-1414 are coupled to a 4:2 receive (Rx) beamforming network having signal outputs having more than one polarization component (1551-1552). As can be seen for each BFN, an associated phase angle is established for each antenna array 1411-1414. To further elaborate, configuration 1500 can establish a transmit phased array with the first alternating ones of the Vivaldi antenna elements (1511-1518) in each of antenna arrays 1411-1414 fed by transmit beamforming network 1542. Transmit beamforming network 1542 comprises beamforming circuitry configured to receive input signals (1553-1554) having at least two polarization components and couple the at least two polarization components among the first alternating ones of the Vivaldi antenna elements (1511-1518) in antenna arrays 1411-1414. Configuration 1500 forms a receive phased array having the second alternating ones of the Vivaldi antenna elements (1501-1508) in each of antenna arrays 1411-1414 coupled to receive beamforming network 1541. Receive beamforming network 1541 comprises beamforming circuitry configured to receive RF energy from each of the second alternating ones of the Vivaldi antenna elements (1501-1508) in antenna arrays 1411-1414 and form output signals having at least two polarization components.

Configuration 1500 can be configured to establish a mode 1 pattern having vertical polarization on one pair of antenna elements and horizontal polarization on another pair of antenna elements. Approximately 40 dB isolation between Tx and Rx can be achieved in such configurations. While the use of four Vivaldi elements per array (referred to as four-petal) with four instances of each array is shown in FIG. 15, it should be understood that eight Vivaldi elements per array might instead be employed (eight-petal) in a one-instance arrangement as seen in FIG. 13. This four-petal arrangement can achieve high isolation among Tx/Rx bands, although has a greater variation in azimuth for an associated radiation pattern than the eight-petal arrangement.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:

an antenna array comprising a plurality of Vivaldi antenna elements arranged about an axis perpendicular to a baseplate;

feed elements coupled to each of the Vivaldi antenna elements through the baseplate, wherein first alternating ones of the Vivaldi antenna elements are configured to transmit radio frequency (RF) energy at a first RF band and second alternating ones of the Vivaldi antenna elements are configured to receive RF energy at a second RF band;

an enclosure component surrounding an outer perimeter of the plurality of Vivaldi antenna elements and having a height approximately as that of the plurality of Vivaldi antenna elements; and a flared horn element mounted to an end of the enclosure component opposite to that of the baseplate.

2. The apparatus of claim 1, wherein the first alternating ones of the Vivaldi antenna elements are configured to direct an RF radiation pattern of the first RF band generally along the axis in a direction away from a face of the baseplate concurrent with the second alternating ones of the Vivaldi antenna elements receiving the RF energy at the second RF band.

3. The apparatus of claim 1, wherein the first alternating ones of the Vivaldi antenna elements are coupled to a 4:2 transmit beamforming network having signal inputs having more than one polarization component.

4. The apparatus of claim 1, wherein the second alternating ones of the Vivaldi antenna elements are coupled to a 4:2 receive beamforming network having signal outputs having more than one polarization component.

5. The apparatus of claim 1, wherein the plurality of Vivaldi antenna elements are arrayed in a pinwheel configuration comprising at least four Vivaldi antenna elements each arranged having an inner edge oriented towards the axis and an outer edge oriented towards a perimeter of the baseplate.

6. The apparatus of claim 1, wherein the antenna array does not employ an absorber element to shape a radiation pattern of the antenna array to a single hemisphere.

7. A system, comprising:

an antenna arrangement having a plurality of antenna arrays, each of the antenna arrays comprising at least four Vivaldi antenna elements arranged perpendicular to a corresponding baseplate;

feed elements coupled to each of the Vivaldi antenna elements through the baseplates;

an enclosure component surrounding an outer perimeter and having a height approximately as that of the Vivaldi antenna elements of the corresponding antenna array;

a flared horn element mounted to an end of the corresponding enclosure component opposite to that of the corresponding baseplate;

wherein first alternating ones of the Vivaldi antenna elements in each of the antenna arrays are configured to transmit radio frequency (RF) energy at a first RF band; and wherein second alternating ones of the Vivaldi antenna elements in each of the antenna arrays are configured to receive RF energy at a second RF band.

8. The system of claim 7, wherein the antenna arrangement forms a transmit phased array having the first alternating ones of the Vivaldi antenna elements in each of the antenna arrays fed by a transmit beamforming network.

9. The system of claim 8, wherein the transmit beamforming network comprises beamforming circuitry configured to receive input signals having at least two polarization components and couple the at least two polarization components among the first alternating ones of the Vivaldi antenna elements in the antenna arrays.

10. The system of claim 7, wherein the antenna arrangement forms a receive phased array having the second alternating ones of the Vivaldi antenna elements in each of the antenna arrays coupled to a receive beamforming network.

11. The system of claim 10, wherein the receive beamforming network comprises beamforming circuitry configured to receive RF energy from each of the second alternating ones of the Vivaldi antenna elements in the antenna arrays and form output signals having at least two polarization components.

12. The system of claim 7, wherein the Vivaldi antenna elements of each of the antenna arrays are arrayed in a pinwheel configuration comprising arranged having an inner edge of each of the Vivaldi antenna elements oriented towards a corresponding central axis and an outer edge oriented towards a corresponding outer perimeter.

13. The system of claim 7, wherein the antenna arrays do not employ absorber elements to shape a radiation pattern of the antenna arrays to a single hemisphere.

14. A method, comprising:

obtaining from transmit circuitry first radio frequency (RF) energy for coupling to corresponding feed points of each of a first plurality of Vivaldi antenna elements mounted about an axis perpendicular to a baseplate, wherein the first plurality of Vivaldi antenna elements are coupled to a 4:2 transmit beamforming network with signal inputs having at least two polarization components;

transmitting the first RF energy primarily along the axis and away from the baseplate;

receiving second RF energy by a second plurality of Vivaldi antenna elements mounted about the axis, wherein the second plurality of Vivaldi antenna elements are coupled to a 4:2 receive beamforming network with signal outputs having at least two polarization components; and obtaining the second RF energy from corresponding feed points of the second plurality of Vivaldi antenna elements and providing the second RF energy to receive circuitry.

15. The method of claim 14, comprising:

transmitting, by the first plurality of Vivaldi antenna elements, the first RF energy comprising a first RF band;

receiving, by the second plurality of Vivaldi antenna elements, the second RF energy at a second RF band; and wherein transmitting, by the first plurality of Vivaldi antenna elements, is at least partially concurrent in time with receiving, by the second plurality of Vivaldi antenna elements.

16. The method of claim 14, wherein the first plurality of Vivaldi antenna elements are alternatively arrayed about the axis with the second plurality of Vivaldi antenna elements.

* * * * *